United States Patent [19]
Hamy
[11] 3,944,044
[45] Mar. 16, 1976

[54] VARIABLE SPEED TRANSPORT SYSTEM

[75] Inventor: Norbert Hamy, Beaconsfield, Canada
[73] Assignee: Tebron Holdings Ltd., Beaconsfield, Canada

[22] Filed: Jan. 9, 1974
[21] Appl. No.: 431,982

[30] Foreign Application Priority Data
Jan. 10, 1973 United Kingdom ................. 1316/73

[52] U.S. Cl. ............................ 198/16 MS; 198/110
[51] Int. Cl.$^2$ .................... B65G 17/00; B61B 13/14
[58] Field of Search ..... 198/16 R, 16 MS, 110, 181; 104/25

[56] References Cited

UNITED STATES PATENTS

| | | | |
|---|---|---|---|
| 3,518,944 | 7/1970 | Patin | 198/16 R |
| 3,621,980 | 11/1971 | Folkes | 198/110 |
| 3,664,266 | 5/1972 | Tonkin | 198/16 MS |
| 3,712,448 | 1/1973 | Burson et al. | 198/16 MS |
| 3,714,902 | 2/1973 | Zuppiger | 198/16 R |
| 3,744,431 | 7/1973 | Cumberbirch | 198/16 MS |

*Primary Examiner*—Evon C. Blunk
*Assistant Examiner*—Jeffrey V. Nase
*Attorney, Agent, or Firm*—Robert J. Schaap

[57] ABSTRACT

A closed loop transport system capable of acceleration and deceleration during the transportation operation in any continuous operating cycle comprising a carrier belt formed of a plurality of carrier belt segments, the system having varying speed drive belts adapted to support and drive the carrier belt segments such that the carrier belt segments are capable of sliding along each other when passing from one constant speed drive belt to a further different constant speed drive belt, whereby the carrier belt segments have a greater inclination with respect to a perpendicular plane passing through the drive belts when on a higher speed drive belt than when on a lower speed drive belt.

19 Claims, 10 Drawing Figures

T
T'
1
2
2a
2b
2c
4
5
6

VARIABLE SPEED TRANSPORT SYSTEM

This invention relates to transport systems. More particularly, this invention relates to transport systems which have portions capable of accelerating and decelerating to give a variable speed transport system.

There are a number of available continuous loop transport systems which employ a continuous belt for transporting supported bodies, such as cargo or people, from one access station to another. Examples of this type of transport system are to be found in some commercial facilities, such as airports and the like, where a continuous belt is adapted to carry people and/or baggage from an embarkation point to a debarkation point. Conventional cargo conveying equipment also relies upon this type of continuous band or belt conveyor system.

However, in each of these systems, the continuous belt used to convey the supported bodies is driven at one linear rotational velocity during the entire operation. In other words, the continuous belt is not accelerated or decelerated during the transportation operation in any continuous operating cycle.

The linear rotational velocity at which the continuous belt is driven in the prior art systems is usuallly relatively slow as the transition from a zero velocity to the actual velocity of the belt cannot be too large. Thus, due to the relatively slow linear rotational velocity, the capacity or volume which the system is capable of handling is also usually low.

It is therefore an object of this invention to provide for a closed loop transport system overcoming the deficiencies of the prior art systems in that the closed loop transport system is capable of acceleration and deceleration throughout portions thereof.

It is a further object of this invention to provide for a closed loop transport system wherein the load-supporting surface of the system may be accelerated or decelerated during the transport operation in any continuous operating cycle.

A still further object of this invention is the provision of a closed loop transport system having a variable length load-supporting carrier belt whereby the belt is capable of expansion and contraction when passing from one portion to a further different speed segment.

Generally, the closed loop transport system according to the present invention may be characterized as comprising the carrier belt, and at least first and second drive assemblies, first and second drive belts associated with said first and second drive assemblies, respectively, said first drive assembly being adapted to drive said first drive belt at a linear rotational speed higher than the linear rotational speed which said second drive assembly is adapted to drive said second drive belt, said carrier belt being formed of a plurality of carrier belt segments, said carrier belt segments being placed on said first and second drive belts in a loosely stacked non-interconnected configuration, each of said carrier belt segments adapted to contact adjacent segments, the carrier belt segments being capable of sliding along each other when passing from said first drive belt to said second drive belt such that each of said carrier belt segments has a greater inclination with respect to a perpendicular plane passing through the drive belt when on said first drive belt than when on said second drive belt.

In greater detail, the closed loop transport system according to the present invention may assume either the horizontal or vertical modes of operation. In other words, in the horizontal configuration the carrier belt is employed throughout its entire length to carry commodities or, alternatively, in the vertical configuration the carrier belt only transports commodities thereupon for a portion of its length.

Drive assemblies according to the present invention are adapted to impart varying linear rotational speed to portions of the carrier belt and also to form a substantially continuous surface upon which the expandable carrier belt segments are placed. In one aspect, these drive assemblies comprise a plurality of individual drive assemblies, each of the individual drive assemblies being driven at one constant linear rotational velocity, the individual drive assemblies being placed so as to give zones of increasing velocity and decreasing velocity. The speed differential between adjacent individual drive assemblies may be varied according to the end use of the transport system - e.g. velocity differentials of 1 mile per hour may be employed when the transport system is adapted for the use of people.

Subject to the conditions mentioned above, the drive assemblies may be any suitable known to those skilled in the art. In a preferred embodiment, the drive assemblies may take the form of a plurality of air-supported drive belts. These air-supported drive belts are arranged in a somewhat overlapping configuration so as to give the effect of a continuous drive belt surface.

The means employed in driving the drive belts may assume any prime mover force. Thus, for example, means such as linear induction motors, drive wheels contacting the drive belts, pneumatic means, etc. may be utilized. In a preferred embodiment, the drive means employed to impart a linear rotational motion to the drive belts comprise a motor driving chain sprocket which in turn drives the individual drive belts.

The carrier belt adapted to form the load-supporting surface of the present transport system comprises a plurality of individual segments which are supported by the uppermost surface of the individual drive belts. These segments are adapted to be loosely stacked on top of the drive belts and preferably extend substantially the width thereof. The individual segments are not interconnected, but rather, each individual segment is adapted to contact adjacent segments at strategic points along the width so as to form a load-supporting surface which is expandable and contractable when passing between differential speed segment zones. These individual segments are of a substantially rigid nature and specially contoured as will be described in greater detail hereinafter.

The segments forming the carrier belt are substantially perpendicular to the drive belt surface when on a relatively low speed drive belt. As the segments pass on to drive belts having a higher linear rotational velocity, the individual segments assume a greater inclination with respect to the vertical. In other words, the height of the carrier belt will be less when driven at a higher speed than when driven at a lower speed.

As mentioned above, the individual segments forming the carrier belt of the present invention are loosely stacked upon the surfaces of the individual drive belts and are not interconnected in any way. However, the outwardly facing surfaces of the drive belts may have ribs or channels therein adapted to engage the ends of the carrier belt members placed thereupon. The carrier belt segments contact each other at all times at least along one point and as they pass through varying rotational speed drive belts, the specially contoured segments slide along one another in a manner which will become more fully clear hereinafter.

In order to provide for a substantially continuous surface upon which the carrier belt member may be placed, adjacent drive belts may have an overall parallelogram configuration. This parallelogram configuration permits each carrier belt segment to make the transition from one constant speed drive belt to a further constant speed drive belt.

Furthermore, as will be discussed in greater detail hereinafter, there is also provided for specially constructed drive belts which permit the use of the closed loop transport system in a horizontal configuration whereby the entire surface of the carrier belt may be utilized to carry commodities and/or people.

Having thus generally described the invention, reference will be made to the accompanying drawings in which.

Figures 1, 2, 5:
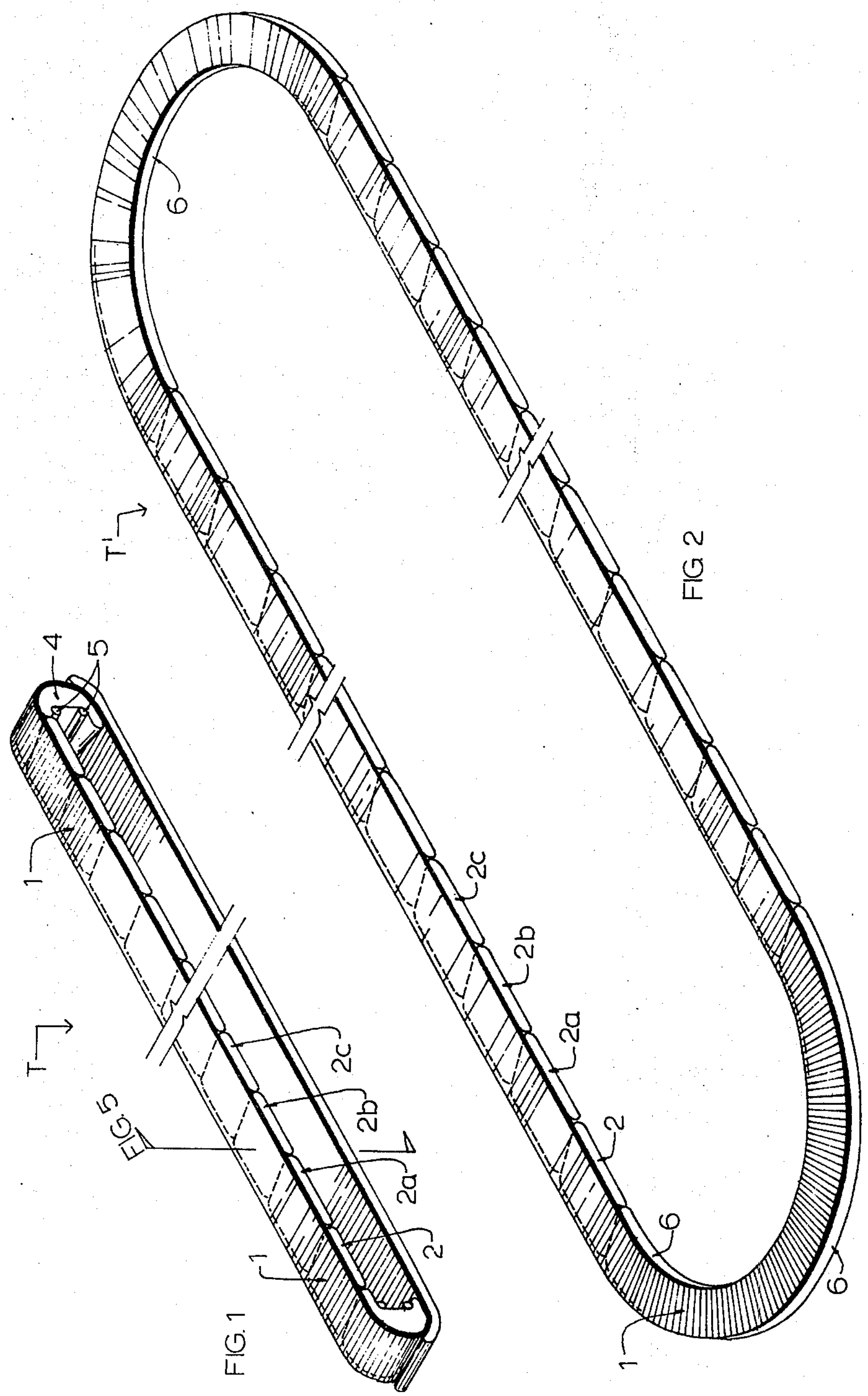
FIG. 1 is a perspective view of a closed loop transport system in a vertical configuration.
FIG. 2 is a perspective view of a closed loop transport system in a horizontal configuration.
FIG. 5 is a cross-sectional view of a closed loop transport system taken along the lines 5—5 of FIG. 1.

Referring now in more detail and by reference characters to the drawings which illustrate a practical embodiment of the present invention, T indicates a closed transport system in the vertical configuration which includes a variable length carrier belt 1. Carrier belt 1 is supported and driven by drive assemblies 2, 2A, 2B . . . throughout the upper portion of its travel and which will be discussed in greater detail hereinafter. Bottom drive assembly 3 is adapted to support and drive the carrier belt 1 during the return or lower portion of its travel. Also shown are end drive assemblies 4 and tension rollers 5.

FIG. 2 illustrates a closed loop transport T' in the horizontal configuration utilizing similar components and like reference numerals have been employed. Thus, the variable length carrier belt 1 is supported and driven by a plurality of drive assemblies 2, 2A, 2B . . . which are arranged along and extend for at least a portion of the length of the continuous carrier belt 1. In this mode of operation, the carrier belt 1 may be used to carry commodities throughout its entire length and bottom drive assemblies are not required. End drive assemblies 6 are adapted to drive the carrier belt 1 through a semi-circle as will be discussed in greater detail.

Figure 7:
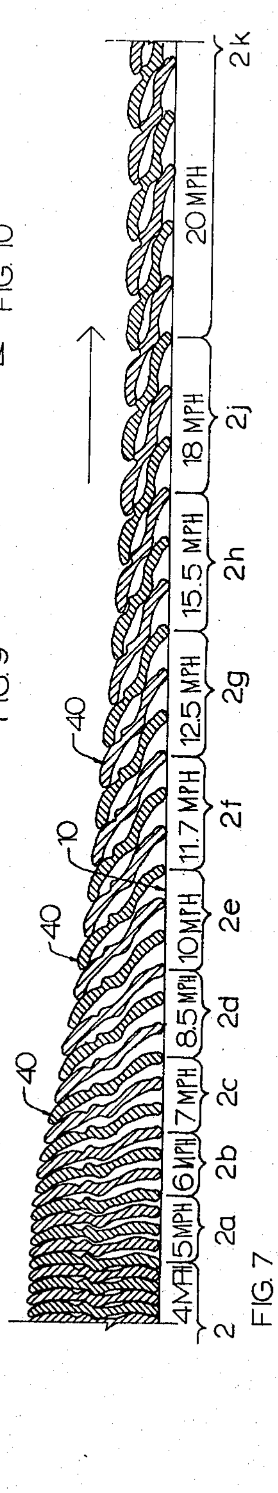
FIG. 7 is a side sectional view of the carrier belt in the acceleration zone.

Referring to FIG. 7, there is illustrated a portion of the closed loop transport system T, which is located in the acceleration zone of the system. Several of the drive assemblies illustrated schematically as 2A, 2B, 2C . . . 2K are located in the acceleration zone and operate in such a manner that each successive drive assembly operates at a progressively higher linear rotational speed. Thus, for example, drive assembly 2A would operate at a speed of, for example, 5 miles per hour, drive assembly 2B at 6 miles per hour, drive assembly 2C at 7 miles per hour, etc. The acceleration zones lead into a constant speed zone which may operate at a speed of, for example, 20 miles per hour as shown by drive assembly 2K. Drive assembly 2K may be a single drive assembly operating at a constant velocity in the constant speed zone, although a plurality of drive assemblies operating at the same linear rotational speed as drive assembly 2K may equally well be employed.

The first of the drive assemblies in the acceleration zone would be located at an access station such as a walk-on zone or the like. The access station could, of course, take a variety of forms. In the case of a conveyor of people, this access station would, in fact, constitute a zone where people could walk on to the continuous carrier belt 1.

Figure 8:
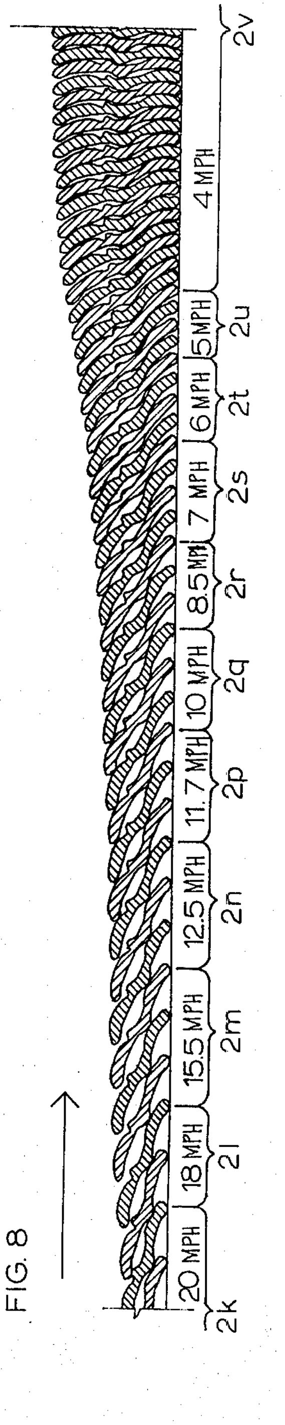
FIG. 8 is a side sectional view of the carrier belt in the deceleration zone.

Illustrated in FIG. 8 and located at the opposite end of the continuous velocity zone designated by drive belt 2K is a deceleration zone also including a plurality of drive assemblies which are illustrated schematically by reference numerals 2K, 2L, 2M . . . 2V. Each of the successive drive assemblies 2K, 2L . . . 2V, in the direction of movement of the carrier belt 1 as illustrated by the arrow, would have progressively decreasing linear rotational speed. Thus, for example, drive assembly 2K, as mentioned above, may operate at a linear rotational velocity of twenty miles per hour, drive assembly 2L 18 miles per hour, drive assembly 2M at 15.5 miles per hour, etc. Located proximate to drive assembly 2V would be a further access station, (not shown) which, in this case, would serve as a debarkation station or a so-called walk-off station for people disembarking from the carrier belt 1.

The actual speed of operation and the difference in linear rotational velocity between the various drive assemblies in both the acceleration zone illustrated in FIG. 7 and the deceleration zone illustrated in FIG. 8 would depend primarily upon the type of supported bodies which are carried by the variable length carrier belt 1. Thus, in the case of people, the differences between linear rotational velocity in the drive assemblies will be relatively low, as for example, a 1 mile per hour differential. In the case of freight shipments, this velocity differential may be increased. Similarly, the number of drive assemblies and the velocity reached in the constant speed zone may be varied according to the end uses and the desired results.

FIG. 5 is a cross-sectional view of the closed loop transport system of FIG. 1 in the vertical configuration and shows a preferred embodiment of the drive belt. Thus, housing 12 encloses an upper drive assembly 2 and a lower drive assembly 2N. Each of the drive assemblies 2, 2N have support bodies 14, the upper surface of which comprises a diaphragm 16. A suitable source of pressurized air (not shown) is supplied to support body 14 and by means of diaphragm 16 or like means is introduced into an air bearing space 18 intermediate diaphragm 16 and belt 10 of drive assembly 2. Located at the edge of air bearing space 18 are side sealing means 20. Thus, drive belt 10 rides on a cushion of air in air bearing space 18.

As mentioned above, the transport system of the present invention may be adapted to carry people and thus, handrails and the like may be employed. Handrail 19, for example, is supported and driven by pulley 22 which is in turn connected to a sprocket drive chain 24 by sprocket 31. Motor 26 has motor drive sprockets 28 which drives chain 24 and also, as illustrated, drives belt 10 by means of a further sprocket chain 25. As may be seen, drive assembly 2N has further sprocket drive means 33 and universal joint 30 is provided on drive assembly 2. Handrail 19 is of an extendable material and also forms a closed loop, handrail 19 being shown returning within the housing 12.

Figures 5, 6:
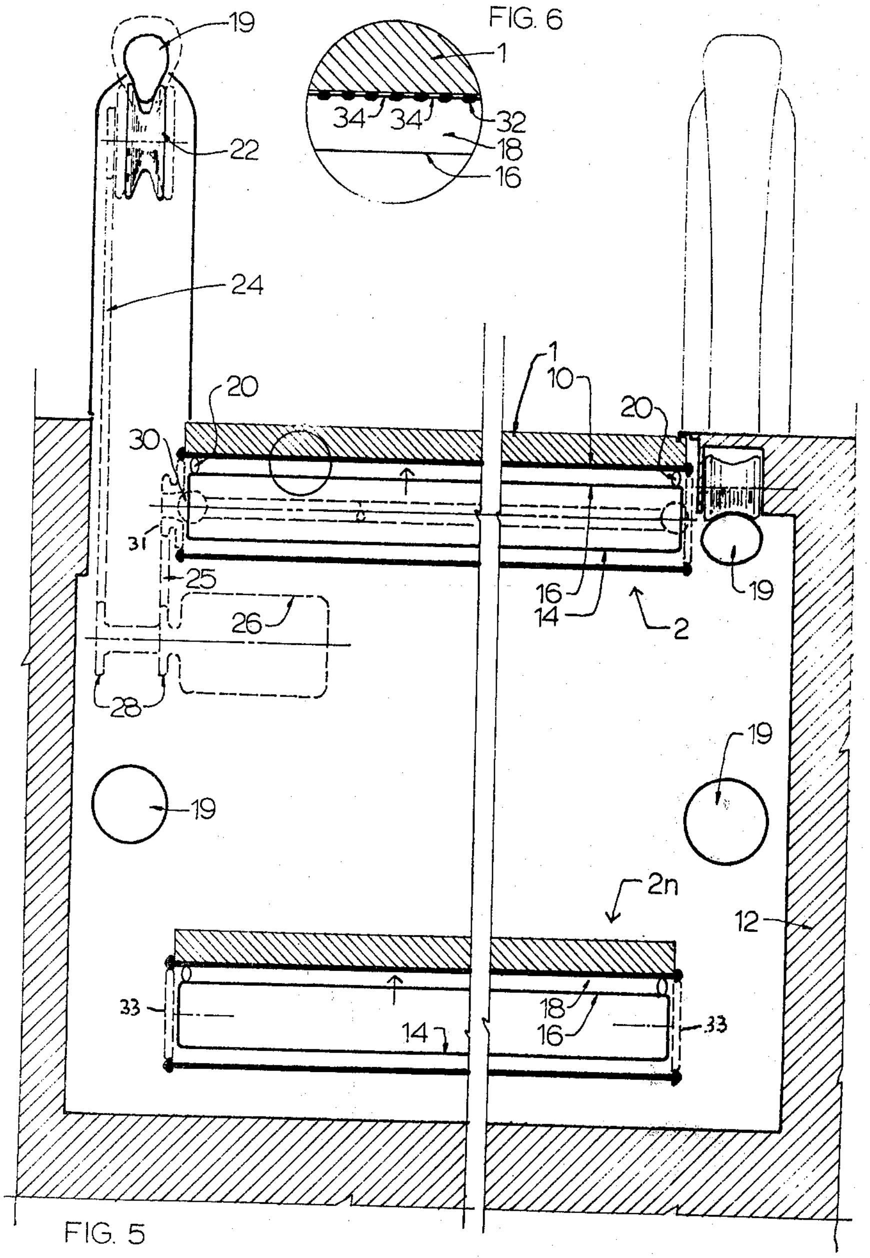
FIG. 6 is an expanded view of a portion of the drive belt and carrier belt of FIG. 5.

FIG. 6 illustrates drive belt 10 which supports the carrier belt 1 and is driven by motor 26 through sprocket chain 25. Drive belt 10 is formed with longitudinal loop cords 32 which are latterly interconnected with a flexible sealing skin 34 which permits the use of diagonal end pads as will be discussed hereinafter.

Figure 4:
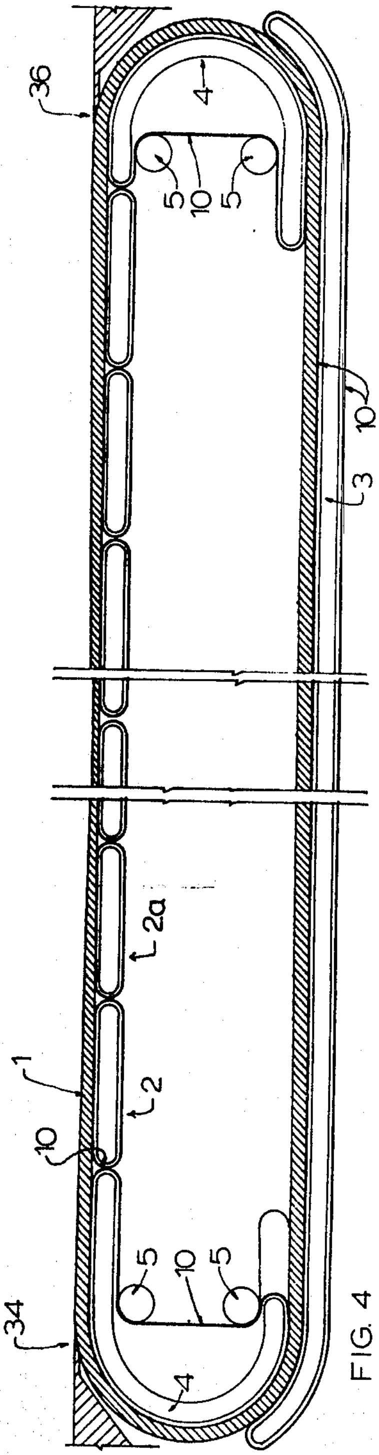
FIG. 4 is a side sectional view of the closed loop transport system of FIG. 1.

FIGS. 1 and 4 illustrate one embodiment which the closed loop transport system T may assume. In these figures, the transport system T has a vertical configuration whereby only a portion of the length of variable length carrier belt 1 is employed for transporting commodities thereupon. Thus, the people or commodities to be transported have access to carrier belt 1 at embarkation point 34. The commodities are then transported throughout an acceleration zone, constant speed zone, and deceleration zone to reach debarkation point 36. The carrier belt then returns via the closed loop to embarkation point 34. At each of the ends of the continuous belt 1 are end transfer pads 4 which are also in the form of previously discussed continuously moving drive belts upon which the continuous carrier belt 1 may rotate. These end transfer pads are equipped with an air supply means to form an air bearing space in the manner previously described with respect to FIG. 5. Furthermore, tension rollers 5 are adapted to entrain the support belt 10. There is also provided for an enlarged return transfer pad 3 which is adapted to support the variable length carrier belt 1 during the return trip. Return transfer pad 3 may likewise be supplied with an air duct and air bearing surface as previously mentioned. In this connection, it should be observed that the return transfer pad 3 may consist of one or more of a series of continuous drive belts which permit the movement of the carrier belt 1 in the manner described with respect to the operation of the carrier belt from embarkation point 34 to debarkation point 36.

In order for the variable length carrier belt 1 to "expand" and "contract" in the heretofore described acceleration and decleration zones, carrier belt 1 is formed of a series of relatively rigid carrier belt segments 40 as illustrated in FIGS. 7 and 8. Each of these segments 40 are identical and specially contoured, not physically interconnected or joined to one another, each segment contacting neighbouring segments at strategic points along its contours. These segments 40 will assume precise orientation in relation to the support belt 10. This precise orientation will be dictated by the speed of the drive means associated with the zone through which they are passing.

It may be observed that the segments are relatively vertically located with respect to the drive belts when passing through the slower speed range, such as when driven by drive means 2, 2V. On passing over successively faster drive belts, when accelerating as shown in FIG. 7, the segments will accordingly assume a greater and greater inclination with respect to the vertical plane of the drive belts. Thus, in the acceleration zone shown in FIG. 7, the relatively rigid segments 40 will assume an almost vertical position when driven in the four mile per hour range and will assume an orientation of about 60 degrees with respect to the vertical in the twenty mile per hour constant velocity zone. This orientation has the effect of diminishing the vertical dimension of the carrier belt while elongating the carrier belt in accordance with the greater speed over a section of the closed loop transport system. It should be observed in this connection, that all vertical loads imparted to the segments of the carrier belts are directly transferred to the various drive belts 10 of the drive assemblies which provide support for the carrier belt 1.

Referring again to FIG. 8, it may be ovserved that the opposite effect will take place as carrier belt 1 moves from the constant velocity zone 2K into the deceleration zone. In this case, the various carrier belt segments 40 will shift from the position where they assume a substantial angular relationship in the constant velocity zone to a position where they are substantially vertically oriented in the lower velocity or deceleration zone.

It should be mentioned that each of the segments 40 of the continuous carrier belt 1 may be cast or otherwise formed from any of a number of metals such as steel, aluminum, or the like. In several cases, depending upon the application of the transport system, these segments may be suitably molded from any of a number of plastic materials such as polystyrene, polybutadiene, or the like.

Figure 9:
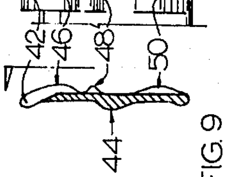
FIG. 9 is a cross-sectional view of a carrier belt segment.
Figure 10:
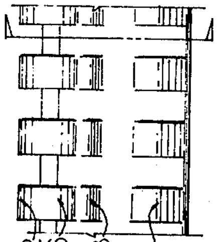
FIG. 10 is an elevational view of the carrier belt segments according to the present invention.

Each of the segments 40 are elongated and the precise length of the members will vary upon the application of the transport system and the differential rates of movement between the various drive assemblies in the acceleration and deceleration zones. Preferably, carrier belt segments 40 extend substantially the transverse width of the drive belts 10 of the various drive assemblies. As best illustrated in FIG. 9, each of the segments 40 is provided with, on one face thereof, a pair of transversely extending shoulders 42 and 44. Similarly, on the opposed transversely extending face, each segment 40 is provided with abutments 46, 48 and 50. Referring again to FIG. 7, it may be observed that in the zone wherein the carrier belt is moving at 4 miles per hour, the carrier belt segments 40 are relatively upright or vertical with respect to the drive belts, and that adjacent segments contact each other at a plurality of points. As the segments pass through zones of increasing velocity, the ends of the segments supported by the drive belt 10 move into a spaced-apart relationship. However, each individual segment 40 contacts or leans on the neighbouring segment along at least one transversely extending point. Thus, in the acceleration zone wherein the carrier belt is driven at a linear speed of 8.5 miles per hour, it may be observed that shoulder 42 of segment 40A will contact abutment 46 of member 40B. As may be seen, as the segments pass from one drive belt to a faster drive belt, the especially contoured segments will slide along an adjacent segment to assume a greater angular relationship with respect to the vertical plane.

As mentioned above, FIG. 8 illustrates a deceleration zone of the transport system according to the present invention. In the deceleration zone, the segments 40 again slide along neighbouring segments as they pass from one constant speed drive belt to a slower constant speed drive belt. In this respect, the segments 40 now slide upwards along each other so as to give an increasing vertical dimension to the carrier belt in the direction of deceleration.

In addition to providing a variable length to the continuous carrier belt 1, it may be observed that these various rigid carrier belt segments 40 easily permit a transition to be made from one velocity to the next succeeding velocity whether in the acceleration zone or in the deceleration zone.

Figure 3:
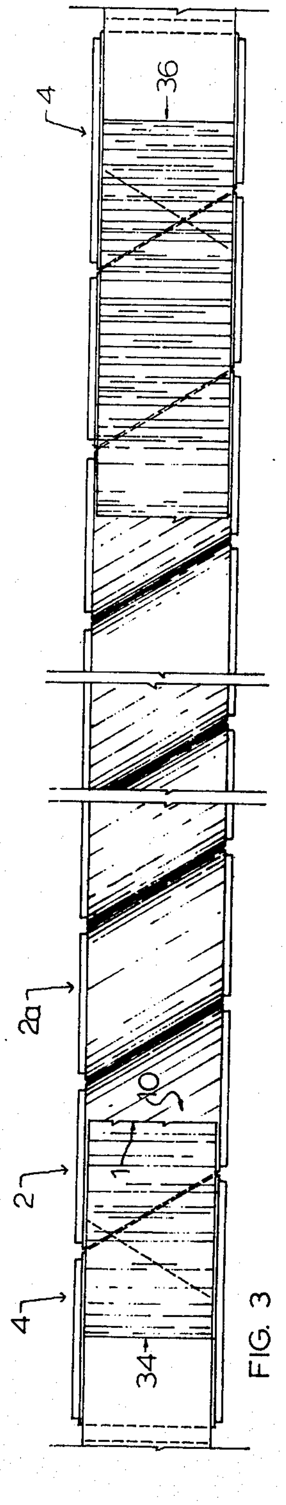
FIG. 3 is a top plan view of the carrier belt.

In order to smooth the transition of the carrier belt segments 40 from one linear rotational velocity to a further linear rotational velocity, the overall configuration of the individual drive pads may resemble that of a parallelogram. Thus, as shown in FIG. 2, along the longitudinal length of the carrier belt 1, the drive pads 2, 2A . . . do not assume the rectangular configuration which might be supposed, rather, the ends of the drive pads are angled with respect to each other as shown by the dotted lines, and as may be observed and as best shown in FIG. 3, each carrier belt segment 40 will thus contact a succeeding drive pad belt at one end of the segment. As the segment moves in the direction of the transport system, the segment smoothly makes the transition from one drive belt to the succeeding drive belt. In this manner, the various rigid carrier belt segments 40 may easily make the transition from one velocity to a progressively higher or lower velocity.

Although this invention has been described with respect to one embodiment, it will be understood that various modifications can be made to the above described embodiments without departing from the spirit and scope of the present invention.

I claim:

1. In a transport system including a plurality of carrier belt segments forming a carrier belt wherein the segments are driven by a plurality of drive belts on which the segments are placed, the improvement wherein opposed and adjacent ends of adjacent drive belts are parallel and diagonally disposed with respect to the direction of travel of the carrier belt segments and the segments are disposed on one of said adjacent drive belts in a loosely stacked physically non-interconnected arrangement and pass to the next adjacent drive belt in such arrangement.

2. A closed loop transport system comprising a carrier belt and at least first and second drive assemblies, first and second drive belts associated with said first and second drive assemblies respectively, said first drive assembly driving said first drive belt at a linear rotational speed higher than a linear rotational speed which said second drive assembly drives said second drive belt, said carrier belt being formed of a plurality of discrete rigid carrier belt segments, placed on said first and second drive belts in a loosely stacked physically non-interconnected configuration, each of said carrier belt segments having lower surfaces disposed upon and in contact with said drive belts and being vertically supported thereby, each of said carrier belt segments contacting adjacent segments, each of said carrier belt segments having at least one abutment portion thereon projecting toward a next adjacent carrier belt segment and each carrier belt segment having a shoulder forming surface opposite to said abutment portion and located to be contacted by the abutment portion of an adjacent carrier belt segment so that each segment receives horizontal support by the next adjacent segment, said carrier belt segments sliding along each other through said abutment portions in sliding contact with the shoulder forming surfaces when passing from said first drive belt to said second drive belt such that each of said carrier belt segments has a greater inclination with respect to a perpendicular plane passing through the drive belts when on said first drive belt than when being supported by said second drive belt.

3. The transport system of claim 2, wherein said drive belts are closed loop drive belts, each of said drive belts being driven by drive means at a constant linear rotational speed.

4. The transport system as defined in claim 3, wherein the transport system has an acceleration zone, a constant speed zone and a deceleration zone, said acceleration zone having a plurality of closed loop drive belts arranged in order of increasing linear rotational velocity, said constant speed zone having at least one closed loop drive belt, and said deceleration zone having a plurality of drive belts arranged in order to decreasing linear rotational velocity.

5. A vertical closed loop transport system as defined in claim 2, where said drive belts are closed loop drive belts, the transport system having an acceleration zone, a constant speed zone and a deceleration zone, said acceleration zone having a plurality of drive belts arranged in order of increasing linear rotational velocity, said constant speed zone having at least one drive belt associated therewith, a decleration zone having a plurality of drive belts arranged in order of decreasing linear rotational velocity, and an embarkation point approximate to said acceleration zone, a debarkation point approximate to said deceleration point, a pair of end transfer pads located at opposed ends of the vertical closed loop system, and at least one return support pad associated therewith.

6. A horizontal closed loop transport system as defined in claim 2 additionally comprising at least two horizontal loop end support pads, said loop end support pads supporting said carrier belt when said carrier belt passes through a curved configuration.

7. The transport system of claim 2, wherein said carrier belt segments extend substantially the transverse width of said drive belts.

8. The transport system of claim 2, wherein each of said carrier belt segments have at least two abutment portions along one transversely extending face thereof, the abutment portions of one segment contacting a shoulder forming surface of an adjacent carrier belt segment and sliding therealong when moving from a first drive belt driven at a constant linear rotational speed to an adjacent drive belt driven at a different constant linear rotational speed.

9. The transport system of claim 12 additionally comprising side guard means, said side guard means transversely retaining said carrier belt segments on said drive belts.

10. In a transport system including a plurality of carrier belt segments forming a carrier belt, and a plurality of drive means having carrier belt engaging surfaces thereon for driving said carrier belt at differential speeds, the improvements wherein the carrier belt segments are loosely stacked on said engaging surface in a physically non-interconnected configuration, each of said segments having a lower surface disposed on and in contact with the engaging surfaces of said drive means and being vertically supported by said drive means, each of said carrier belt segments also having a pair of opposed major faces, one of said major faces having at least three spaced apart transversely extending abutment portions, the other major face having at least two spaced apart transversely extending abutment portions, said abutment portions providing contact points at which each segment contacts and horizontally supports adjacent segments for at least a portion of the travel of the segments.

11. A transport system comprising a plurality of carrier belt segments forming a carrier belt, at least first and second drive assemblies associated with said carrier belt and having movable carrier belt drive surfaces thereon, said first drive assembly driving a first portion of said carrier belt at a relatively low constant linear speed, said second drive assembly driving a further portion of said carrier belt at a higher linear constant speed, said carrier belt segments being placed on said drive assemblies and in contact with said drive surfaces in a loosely stacked physically non-interconnected configuration, the improvement wherein each of said segments comprises an elongated member having a substantial height relative to the thickness, said segments having a lower engaging surface in contact with said movable drive surface and being vertically supported thereby, each of said segments having at least one abutment portion thereon projecting toward a next adjacent carrier belt segment and each carrier belt segment having a shoulder forming surface opposite to said abutment portion and located to be contacted by the abutment portion of an adjacent carrier belt segment so that each segment receives horizontal support by the next adjacent segment so that said carrier belt segments are supported vertically solely by said movable drive surface and horizontally by contact with adjacent segments.

12. A transport system comprising a plurality of carrier belt segments forming a carrier belt, said carrier belt extending in a closed loop path conveyor in a substantially horizontal direction, at least first and second drive assemblies associated with said carrier belt, said first drive assembly driving a first portion of said carrier belt at a relatively low constant linear speed, said second drive assembly driving a further portion of said carrier belt at a higher linear constant speed, said carrier belt segments having lower edge portions being placed on and in contact with said drive assemblies in a loosely stacked physically non-interconnected configuration, each of said carrier belt segments having at least one abutment portion thereon projecting toward a next adjacent carrier belt segment and each carrier belt segment having a shoulder forming surface opposite to said abutment portion and located to be contacted by the abutment portion of an adjacent carrier belt segment so that each segment receives horizontal support by the next adjacent segment, each of said carrier belt segments contacting adjacent segments and sliding along each other through sliding contact between said abutment portions and shoulder forming surfaces such that said carrier belt segments have a greater inclination with respect to a perpendicular plane passing through said carrier belt when on a higher speed drive assembly than when on a lower speed drive assembly.

13. A transport system comprising a plurality of discrete carrier belt segments forming a carrier belt, drive assemblies associated with said carrier belt, said drive assemblies driving at least one portion of said carrier belt at a relatively low constant linear speed and at least one further portion of said carrier belt at a higher linear constant speed, said carrier belt segments being supported in a loosely stacked physically non-interconnected configuration, each of said carrier belt segments having lower surfaces disposed upon and in contact with said drive assemblies and being vertically supported by said drive assemblies, each of said carrier belt segments having at least one abutment portion thereon projecting toward a next adjacent carrier belt segment and each carrier belt segment having a shoulder forming surface opposite to said abutment portion and located to be contacted by the abutment portion of an adjacent carrier belt segment so that each segment receives horizontal support by the next adjacent segment, each of said adjacent segments sliding along each other such that said carrier belt segments have a greater inclination with respect to a perpendicular plane passing through said carrier belt when on the higher speed portion than when on the lower speed portion, each of said drive assemblies comprising an air duct support body, a closed loop drive belt passing around said support body, an air bearing space intermediate said support body and drive belt supporting said drive belt, means for supplying pressurized air to said air bearing space, side sealing means minimizing the loss of air from said air bearing space, and means for driving said drive belt.

14. A transport system comprising a carrier belt formed of a plurality of discrete carrier belt segments at least first and second drive assemblies, first and second drive belts associated with said first and second drive assemblies respectively, said first drive assembly driving said first drive belt at a linear rotational speed higher than the linear rotational speed which said second drive assembly drives said second drive belt, said carrier belt segments being placed on said first and second drive belts in a loosely stacked physically non-interconnected configuration, each of said carrier belt segments having lower surfaces disposed upon and in contact with said drive belts and being vertically supported thereby, each of said carrier belt segments contacting adjacent segments, each of said carrier belt segments also having at least one abutment portion thereon projecting toward a next adjacent carrier belt segment and each carrier belt segment having a shoulder forming surface opposite to said abutment portion and located to be contacted by the abutment portion of an adjacent carrier belt segment so that each segment receives horizontal support by the next adjacent segment, said carrier belt segments sliding along each other by contact through said abutment portions and shoulder forming surfaces when passing from said first drive belt to said second drive belt such that each of said carrier belt segments has a greater inclination with respect to a perpendicular plane passing through the drive belts when on said first drive belt than when being supported by said second drive belt, said drive belts having end margins which are angularly disposed with respect to each other such that said carrier belt segments, when passing from one drive belt to a further drive belt, will contact said further drive belt at an edge thereof.

15. The system of claim 14 wherein each of said drive belts has a plurality of transversely extending channels on a surface thereof, each of said channels receiving and engaging a portion of said carrier belt segments.

16. The transport system of claim 14 wherein each of said drive belts comprises longitudinal loop cords which are laterally interconnected with a flexible sealing skin.

17. The transport system of claim 14 wherein each of said drive assemblies comprises an air duct support body, a closed loop drive belt disposed about said support body, an air bearing space intermediate said support body and drive belts for supporting said drive belts, means for supplying pressurized air to said support duct and air bearing space, side sealing means for minimizing the loss of air from said air bearing space, and means for driving said drive belt.

18. A vertical closed loop transport system as defined in claim 17, where said drive belts are closed loop drive belts, the transport system having an acceleration zone, a constant speed zone and a deceleration zone, said acceleration zone having a plurality of drive belts arranged in order to increasing linear rotational velocity, said constant speed zone having at least one drive belt associated therewith, a deceleration zone having a plurality of drive belts arranged in order of decreasing linear rotational velocity, and an embarkation point approximate to said acceleration zone, a debarkation point approximate to said deceleration point, a pair of end transfer pads located at opposed ends of the vertical closed loop system, and at least one return support pad associated therewith.

19. A horizontal closed loop transport system as defined in claim 17 additionally comprising at least two horizontal loop end support pads, said loop end support pads supporting said carrier belt when said carrier belt passes through a curved configuration.

* * * * *